United States Patent
Oswald et al.

(10) Patent No.: US 10,323,847 B2
(45) Date of Patent: Jun. 18, 2019

(54) WEAR RESISTANT FRAME LINER JOINT ASSEMBLY FOR A GAS TURBINE ENGINE

(71) Applicant: General Electric Company, Schenectady, NY (US)

(72) Inventors: Eric Robert Oswald, Cincinnati, OH (US); Scott Patrick Ryczek, Cincinnati, OH (US); Tod Kenneth Bosel, Cincinnati, OH (US); Robert Czachor, Farmer City, IL (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 569 days.

(21) Appl. No.: 14/984,733

(22) Filed: Dec. 30, 2015

(65) Prior Publication Data
US 2017/0191669 A1    Jul. 6, 2017

(51) Int. Cl.
*F23R 3/60* (2006.01)
*F16B 5/02* (2006.01)
(Continued)

(52) U.S. Cl.
CPC .............. *F23R 3/60* (2013.01); *F01D 11/005* (2013.01); *F01D 25/246* (2013.01); *F16B 5/02* (2013.01);
(Continued)

(58) Field of Classification Search
CPC ..................................... F23R 3/50; F23R 3/60
See application file for complete search history.

(56) References Cited

U.S. PATENT DOCUMENTS 5,289,677 A * 3/1994 Jarrell ...................... F23R 3/60
60/752
5,451,116 A   9/1995 Czachor et al.
(Continued)

FOREIGN PATENT DOCUMENTS

| EP | 2 784 333 A1 | 10/2014 |
| EP | 2784333 A1 | 10/2014 |

OTHER PUBLICATIONS

First Office Action and Search issued in connection with corresponding CN Application No. 201611261304.9 dated Mar. 9, 2018.
(Continued)

*Primary Examiner* — Arun Goyal
(74) *Attorney, Agent, or Firm* — General Electric Company; William Scott Andes (57) ABSTRACT

A tripod joint assembly for connecting first and second overlapping panel segments of a flowpath liner in a gas turbine engine includes a threaded fastener extending through an opening in the first overlapping panel segment and adjacent to an outer segment edge of the second overlapping panel segment disposed on the first overlapping segment. The assembly further includes a tripod plate having first and second plate edges and an access hole therebetween. The first plate edge contacts the first overlapping panel segment, the second plate edge contacts the outer segment edge of the second overlapping panel segment. The access hole is disposed around the threaded fastener. First and second washers are disposed around the threaded fastener, the first washer on the tripod plate opposite to the overlapping panel segments, and the second washer on the first washer opposite to the tripod plate. A threaded locknut secures the assembly.

17 Claims, 4 Drawing Sheets

(51) Int. Cl.
    *F16B 39/28*     (2006.01)
    *F23R 3/50*     (2006.01)
    *F01D 11/00*     (2006.01)
    *F01D 25/24*     (2006.01)

(52) U.S. Cl.
    CPC ............... *F16B 39/28* (2013.01); *F23R 3/50* (2013.01); *F05D 2230/642* (2013.01); *F05D 2230/90* (2013.01); *F05D 2260/31* (2013.01); *F05D 2260/38* (2013.01)

(56) References Cited

U.S. PATENT DOCUMENTS

| | | | |
|---|---|---|---|
| 6,148,604 A * | 11/2000 | Salt | F01D 9/023 60/39.37 |
| 6,334,298 B1 * | 1/2002 | Aicholtz | F23R 3/283 60/750 |
| 9,988,982 B2 * | 6/2018 | Delaunay | F23R 3/46 |
| 2010/0011576 A1 | 1/2010 | Sutcu et al. | |
| 2013/0336782 A1 | 12/2013 | Ryczek et al. | |
| 2015/0252691 A1 | 9/2015 | Sasse et al. | |

OTHER PUBLICATIONS

Extended European Search Report and Opinion issued in connection with corresponding EP Application No. 16203388.0 dated May 17, 2017.

* cited by examiner

WEAR RESISTANT FRAME LINER JOINT ASSEMBLY FOR A GAS TURBINE ENGINE

BACKGROUND

The field of the disclosure relates generally to gas turbine engines and, more particularly, to a center frame construction and a joint assembly in a gas turbine engine.

Gas turbine engines are known to include an annular turbine center frame and a flowpath liner to protect the frame and its casing from hot gases passing through the frame. The flowpath liner is exposed to the hot engine gases and thus expands and contracts in the circumferential direction about the annular frame at a higher magnitude than the engine casing to which it is attached, since the liner shields the casing from direct exposure to the same high temperature gases. Due to the significance of expansion and contraction of the liner, the liner is typically segmented so that individual segments are exposed to smaller fractions of the overall thermal expansion phenomenon. To sufficiently shield the casing from high temperature gases, the individual segments of the flowpath liner must contact each other and overlap one another where adjacent segments meet.

The continual expansion and contraction of individual flowpath liner segments causes wear along the edges where individual segments meet and slide against one another. It has been known in some cases to provide a wear-resistant coating along individual segment edges that slide against one another, in order to mitigate the amount of wear seen by individual edges over time. This conventional practice though, only protects against component wear in the two dimensional, circumferential direction of thermal expansion/contraction. As the wear-resistant coating thins over time, often due to friction between the sliding edges, joints holding individual overlapping segments against one another experience some play between the overlapping segments in the direction perpendicular to the circumferential direction. Over time, this play between segments can result in rattling, or "chatter", in the perpendicular direction, thereby leading to structural damage to not only the overlapping segments, but also to the joints themselves.

BRIEF DESCRIPTION

In one embodiment, a tripod joint assembly for connecting first and second overlapping panel segments of a flowpath liner in a gas turbine engine includes a threaded fastener extending through an opening in the first overlapping panel segment and adjacent to an outer segment edge of the second overlapping panel segment disposed on the first overlapping segment. The tripod joint assembly further includes a tripod plate having first and second plate edges and an access hole therebetween. The first plate edge contacts the first overlapping panel segment, the second plate edge contacts the outer segment edge of the second overlapping panel segment, and the access hole is disposed around the threaded fastener. A first washer is disposed around the threaded fastener on the tripod plate opposite to the first and second overlapping panel segments. A second washer is disposed around the threaded fastener on the first washer opposite to the tripod plate. A threaded locknut is secured to the threaded fastener and contacts the second washer opposite to the first washer.

In another embodiment, a flowpath liner assembly for a gas turbine engine includes an annular forward hanger, an annular aft hanger, and a plurality of panel segments disposed radially between the annular forward hanger and the annular aft hanger. Each of the plurality of panel segments has first and second opposing engagement edges extending in the radial direction. The flowpath liner assembly further includes a plurality of fairing platforms disposed radially between the annular forward hanger and the annular aft hanger. Each of the plurality of fairing platforms has first and second opposing extension edges extending in the radial direction. The plurality of fairing platforms is configured to be disposed in an alternating arrangement with the plurality of panel segments, and each of the first and second opposing extension edges is configured to overlap with a respective adjacent engagement edge of the plurality of panel segments. The flowpath liner assembly still further includes a plurality of tripod joint assemblies configured to couple each of the extension edges with a respective adjacent engagement edge. Each of the plurality of tripod joint assemblies includes a threaded fastener fixedly attached to a respective engagement edge, a tripod plate of wear-resistant material and having first and second plate edges configured to respectively contact an extension edge and a respective adjacent engagement edge, a spring washer disposed around the threaded fastener on the tripod plate opposite to the respective extension edge and adjacent engagement edge, and a threaded locknut configured to apply a bias to the spring washer when secured to the threaded fastener.

In yet another embodiment, a gas turbine engine includes a high pressure turbine, a high pressure turbine rotor shaft, and a low pressure turbine. The gas turbine engine further includes an annular center frame disposed between the high pressure turbine and the low pressure turbine. The annular center frame is configured to support the high pressure turbine shaft. The gas turbine engine still further includes a flowpath liner disposed between the high pressure turbine and the low pressure turbine. The flowpath liner is fixedly attached to the annular center frame and is configured to shield the annular center frame from exposure to high temperature gases from the high pressure turbine. The flowpath liner includes a plurality of radially disposed panel segments circumferentially arranged around the annular center frame, and a plurality of radially disposed fairing platforms circumferentially arranged around the annular center frame to alternate with adjacent ones of the plurality of radially disposed panel segments. Each of the radially disposed panel segments has a circumferential region of overlap with each of the adjacent radially disposed fairing platforms, respectively. The flowpath liner further includes a plurality of tripod joint assemblies configured to couple each of the radially disposed panel segments with each of the adjacent radially disposed fairing platforms, respectively, at respective circumferential regions of overlap. Each of the tripod joint assemblies includes a threaded fastener extending through a respective region of overlap in a vertical direction perpendicular to the circumferential direction, a tripod plate made of a wear-resistant material disposed around the threaded fastener in a direction substantially parallel to a plane defined by movement in the circumferential direction, a spring washer configured to apply a bias force against the tripod plate in the vertical direction such that the tripod plate is capable of coupling a respective radially disposed panel segment with a radially disposed fairing platform in the respective region of overlap, and a threaded locknut configured to maintain the bias force of the spring washer when secured to the threaded fastener.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 1-4 show example embodiments of the systems described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The following detailed description illustrates embodiments of the disclosure by way of example and not by way of limitation. It is contemplated that the disclosure has general application to increasing recovered pressure from airflow into a bleed cavity of a gas turbine engine.

The following description refers to the accompanying drawings, in which, in the absence of a contrary representation, the same numbers in different drawings represent similar elements.

Figure 1:
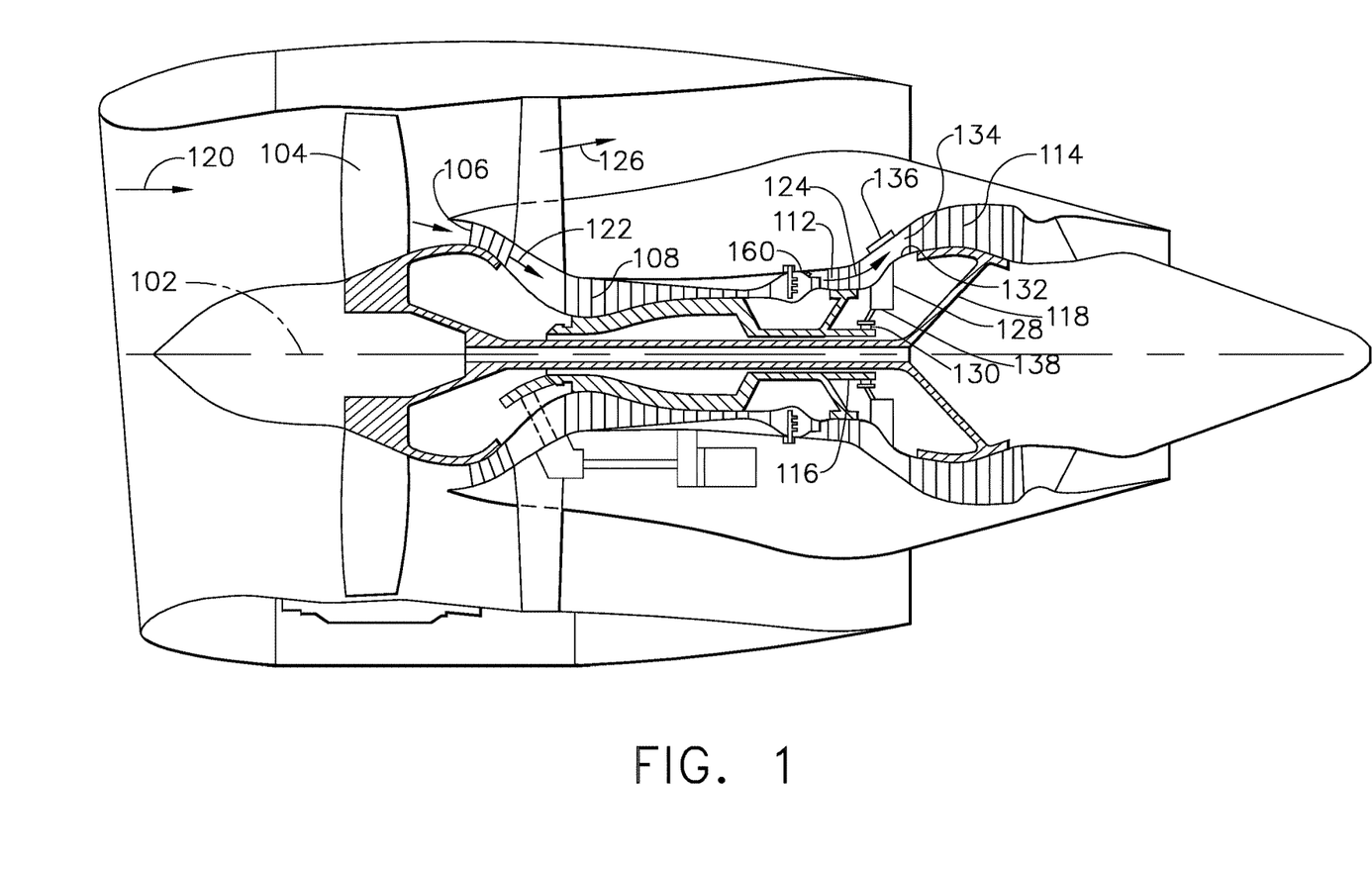
FIG. 1 illustrates a sectional view of an exemplary turbofan gas turbine engine including a turbine flowpath assembly in accordance with an exemplary embodiment.

FIG. 1 illustrates a longitudinal cross-section of an exemplary gas turbine engine 100. Engine 100 includes, in serial axial flow communication, about an axially extending longitudinal centerline 102, a fan 104, a booster 106, a high pressure compressor 108, a combustor 110, a high pressure turbine 112, and a low pressure turbine 114. High pressure turbine 112 is drivingly connected to high pressure compressor 108 with a first rotor shaft 116 and low pressure turbine 114 is drivingly connected to both booster 106 and fan 104 with a second rotor shaft 118.

During operation of engine 100, ambient air 120 enters an engine inlet (not numbered) and a primary, or core, gas stream 122, passes through fan 104, booster 106, and high pressure compressor 108, being pressurized by each component in succession. Primary gas stream 122 then enters combustor 110 where the pressurized air is mixed with fuel to provide a high energy gas stream 124. High energy gas stream 124 then enters, in succession, high pressure turbine 112 (where gas stream 124 is expanded) with energy extracted to drive high pressure compressor 108 and low pressure turbine 114, where gas stream 124 is further expanded with energy being extracted to drive fan 104 and booster 106.

A bypass air flow 126 passes through fan 104 before exiting engine 100. Engine 100 includes an annular turbine center frame 128 positioned between high pressure turbine 112 and low pressure turbine 114. Turbine center frame 128 rotatably supports first rotor shaft 116. Turbine center frame 128 is disposed downstream of high pressure turbine 112. A frame liner 132 is disposed between turbine center frame 128 and high energy gas stream 124, and shields turbine center frame 128 from direct exposure to hot combustion gases.

Frame liner 132 further provides a flowpath 134 of air and hot engine gases through turbine center frame 128. Turbine center frame 128 includes an annular outer casing 136 annularly disposed around longitudinal centerline 102. Turbine center frame 128 further includes an annular inner hub 138 disposed coaxially with outer annular outer casing 136 about longitudinal centerline 102 and spaced radially inwardly from annular outer casing 136. In an exemplary embodiment, a plurality of circumferentially spaced hollow struts (not shown) extend radially between, and are fixedly attached to, annular outer casing 136 and annular inner hub 138.

Figure 2:
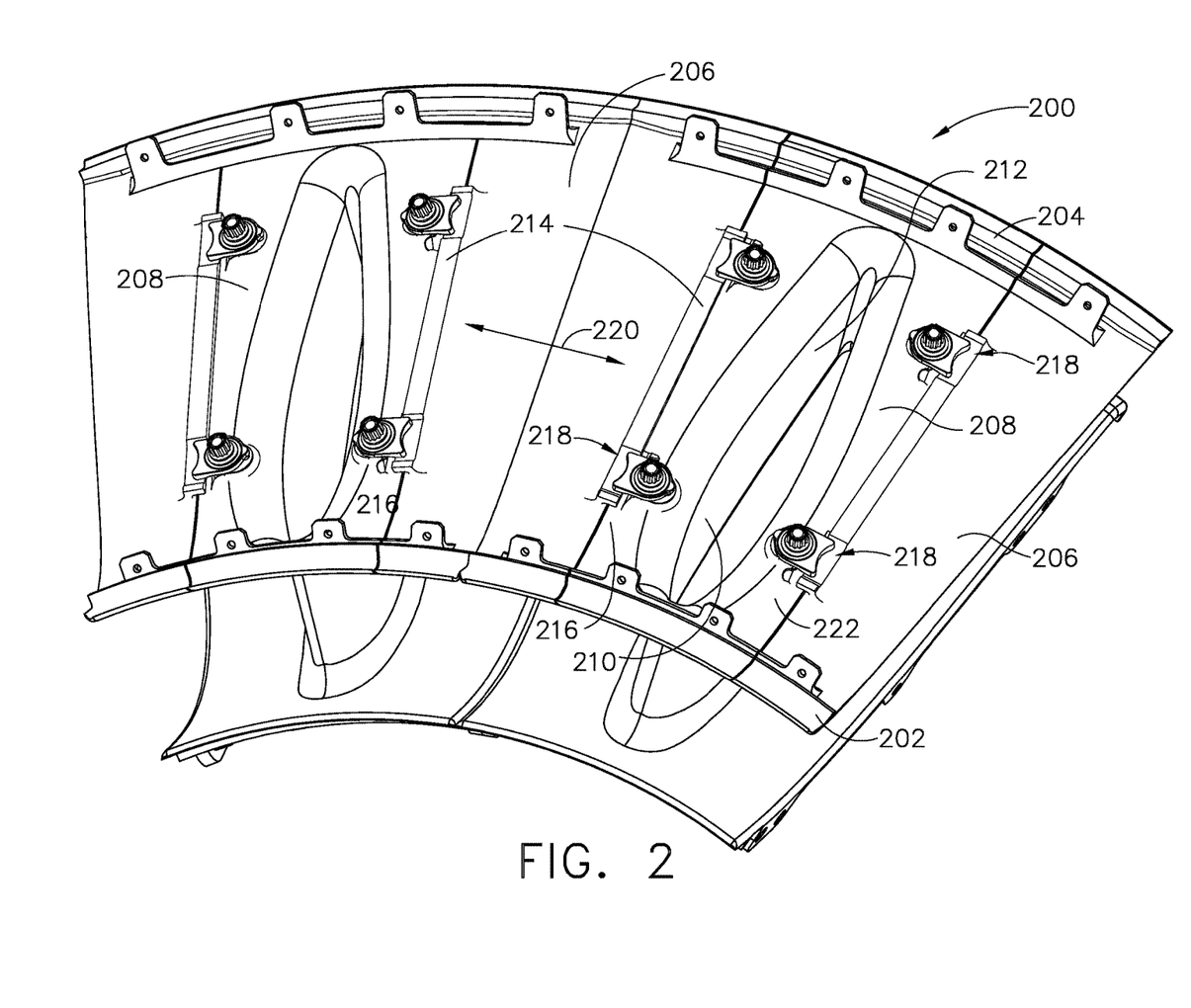
FIG. 2 illustrates a partial oblique perspective view of an exemplary turbine flowpath assembly.

FIG. 2 illustrates an exemplary embodiment of a turbine flowpath assembly 200. In an aspect of the embodiment, flowpath assembly 200 is annular, and is configured to be fixedly attached to a frame (e.g., turbine center frame 128, FIG. 1) of a gas turbine engine (e.g., gas turbine engine 100, FIG. 1).

Turbine flowpath assembly 200 includes a forward annular hanger 202 and an aft annular hanger 204 disposed concentrically and coaxially (i.e., longitudinal centerline 102, FIG. 1) about forward annular hanger 202. Turbine flowpath assembly 200 further includes a plurality of liner panel segments 206 disposed radially between forward annular hanger 202 and aft annular hanger 204, evenly about a central axis (not shown, e.g., longitudinal centerline 102, FIG. 1) at turbine flowpath assembly 200. Disposed alternatingly between adjacent liner panel segments 206 are a plurality of fairing platforms 208, respectively.

Fairing platforms 208 also extend radially from forward hanger 202 to aft hanger 204, and each of fairing platform 208 includes at least one hollow airfoil 210 to allow hot engine gases (e.g., gas stream 124, FIG. 1) to flow therethrough. In an exemplary embodiment, hollow airfoil 210 further includes an inner wall 212 to shield engine components (e.g., turbine center frame 128 from direct exposure to hot engine gases. Liner panel segments 206 further include a plurality of radial engagement edges 214 configured to radially couple with a plurality of fairing extensions 216 disposed adjacent respective radial engagement edges 214. Radial engagement edges 214 are configured to overlap respective fairing extensions 216 in the direction perpendicular to the radial direction. Radial engagement edges 214 are coupled with respective fairing extensions 216 by a plurality of joint assemblies 218.

In operation, upon exposure to hot engine gases (e.g., gas stream 124, FIG. 1), the material of individual liner panel segments 206 will thermally expand (and contract upon cooler temperatures) in a thermal expansion direction 220. To compensate for liner panel segment thermal expansion, respective radial engagement edges 214 are configured to slidably engage fairing extensions 216 in thermal expansion direction 220. In an exemplary embodiment, an under surface (not shown, see FIGS. 3-4, below) of radial engagement edge 214 and an upper surface 222 of fairing extension 216 are coated with a wear-resistant material where the respective surfaces slidably engage each other. In an aspect of the embodiment, the wear-resistant material is applied to the respective surfaces by spraying or brazing, and can be a cobalt-base coating.

Figure 3:
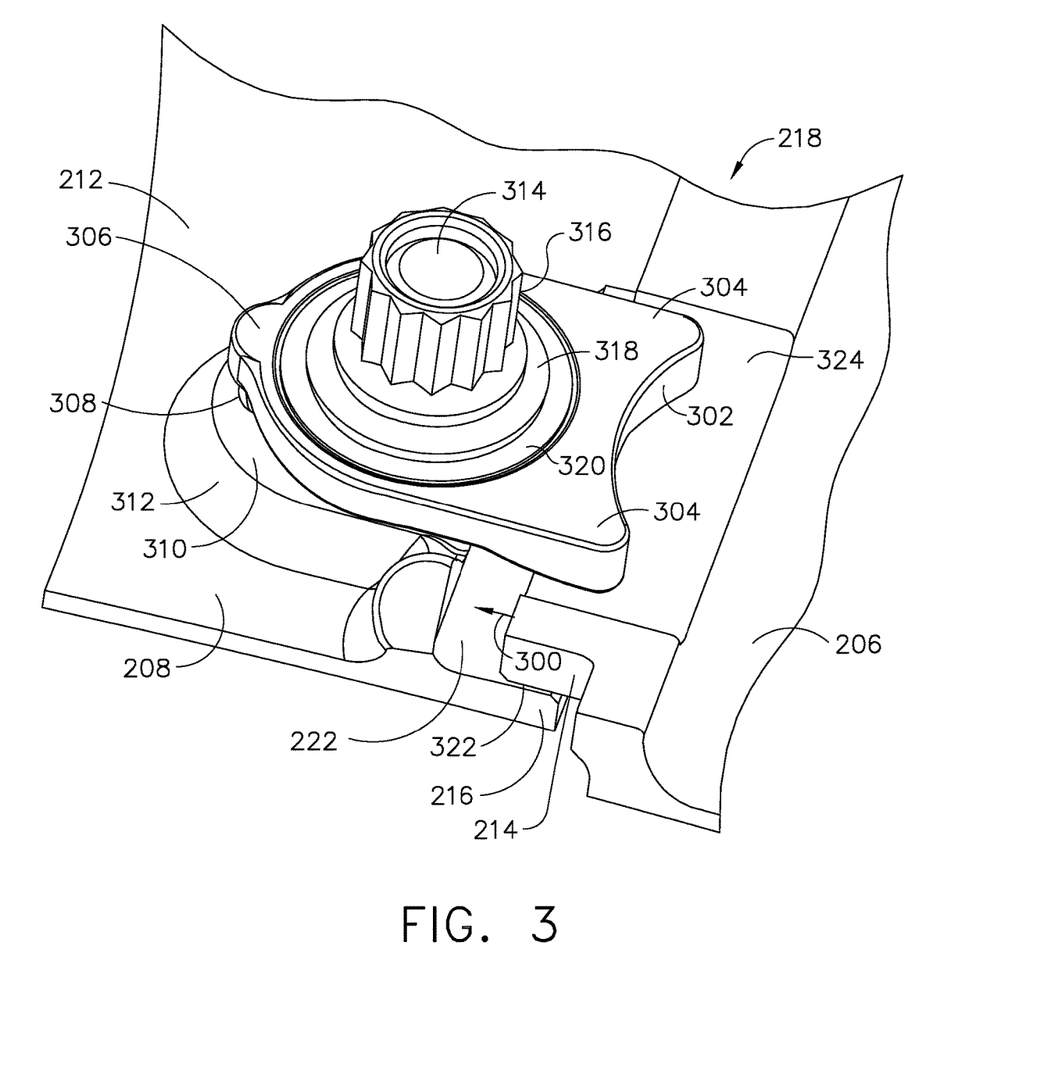
FIG. 3 illustrates an oblique perspective close-up view of the tripod joint assembly shown in FIG. 2.

FIG. 3 illustrates a close-up perspective view of the tripod joint assembly 218 shown in FIG. 2. The same components shown in both FIGS. 2 and 3 are referred to by the same component number in both drawings. Referring specifically to FIG. 3, tripod joint assembly 218 couples radial engagement edge 214 in slidable engagement with fairing extension 216 in a direction 300. Direction 300 represents movement of radial engagement edge 214 with respect to fairing extension 216 of fairing platform 208 from thermal expansion of liner panel segments 206.

Tripod joint assembly 218 further includes a tripod plate 302 having at least two button legs 304 opposite a protrusion leg 306. Protrusion leg 306 includes a downward protrusion 308 for engaging a locating indentation (not shown, see FIG. 4) in an upper flat surface 310 of a mounting base 312 of fairing platform 208. In an exemplary embodiment, tripod joint assembly 218 further includes a threaded fastener 314 extending through tripod plate 302. A threaded nut 316 attaches to an end (not numbered) of threaded fastener 314 and secures tripod plate 302 therebetween. A spring washer 318 is disposed around threaded fastener 314 between threaded nut 316 and tripod plate 302. A spherical washer 320 is disposed around threaded fastener 314 between tripod plate 302 and spring washer 318.

In operation, tripod joint assembly securely and tightly holds radial engagement edge 214 to fairing extension 216 as liner panel segment 206 expands and contracts upon exposure to varying temperatures of thermal engine gases. Upper surface 222 of fairing extension 216 and an under surface 322 of radial engagement edge 214 are coated with a wear-resistant material to prevent deterioration of the physical structure of upper surface 222 and under surface 322 as they continually slide across one another.

Conventionally, however, the constant back-and-forth movement of the liner panel segments with respect to the fairing platforms has also required slidable movement of the liner panel segments with respect to the tripod plates. The sliding tripod plates will then wear over time into contacting surfaces of both the liner panel segments and the fairing platforms. As these contacting surfaces wear, the tripod plates loosen and rattle between the threaded nut and the segments/platforms. Rattling of the tripod plates may cause increased damage to the respective contacting surfaces of the liner panel segments in the fairing platforms, and also to the threaded fasteners that secure these components together vertically.

Exemplary tripod joint assembly 218 mitigates these known problems by applying a wear-resistant material to not only upper surface 222 of fairing extension 216 and under surface 322 of radial engagement edge 214, but additionally to upper flat surface 310 of mounting base 312, as well as an upper contact surface 324 of radial engagement edge 214 that slidably engages a button (not shown, see FIG. 4) of button legs 304. In an aspect of the embodiment, tripod plate 302 is itself fabricated from a wear-resistant material. Alternatively all outer surfaces of button legs 304 protrusion 308 are coated with a wear-resistant material.

In further operation, the advantageous utilization of wear-resistant coatings and materials disclosed herein will mitigate, but may not eliminate, wear between respective surfaces of liner panel segments 206, fairing platforms 208, and tripod plates 302. The wear-resistant coatings and materials are most effective in mitigating damage caused by sliding movement in the plane of sliding engagement (i.e., directions 220, 300). Nevertheless, over time the thickness of the wear-resistant coating and materials may decrease, and thereby create play between the respective components in a direction perpendicular to the plane of sliding engagement (i.e., in a longitudinal direction of threaded fastener 314, not shown).

Accordingly, the advantageous inclusion of spring washer 318 with the wear resistant coatings and materials described herein addresses movement between the respective components in three dimensions. As the wear resistant coatings and materials decrease in thickness over time, spring washer 318 provides continuous bias force in the thickness direction, thereby maintaining a tight slidable engagement between liner panel segments 206, fairing platforms 208, and tripod plates 302, even as some wear between these respective components occurs. This three-dimensional engagement considerably reduces the amount of wear between the components over time, and thus significantly reduces the amount of maintenance and replacement costs.

Figure 4:
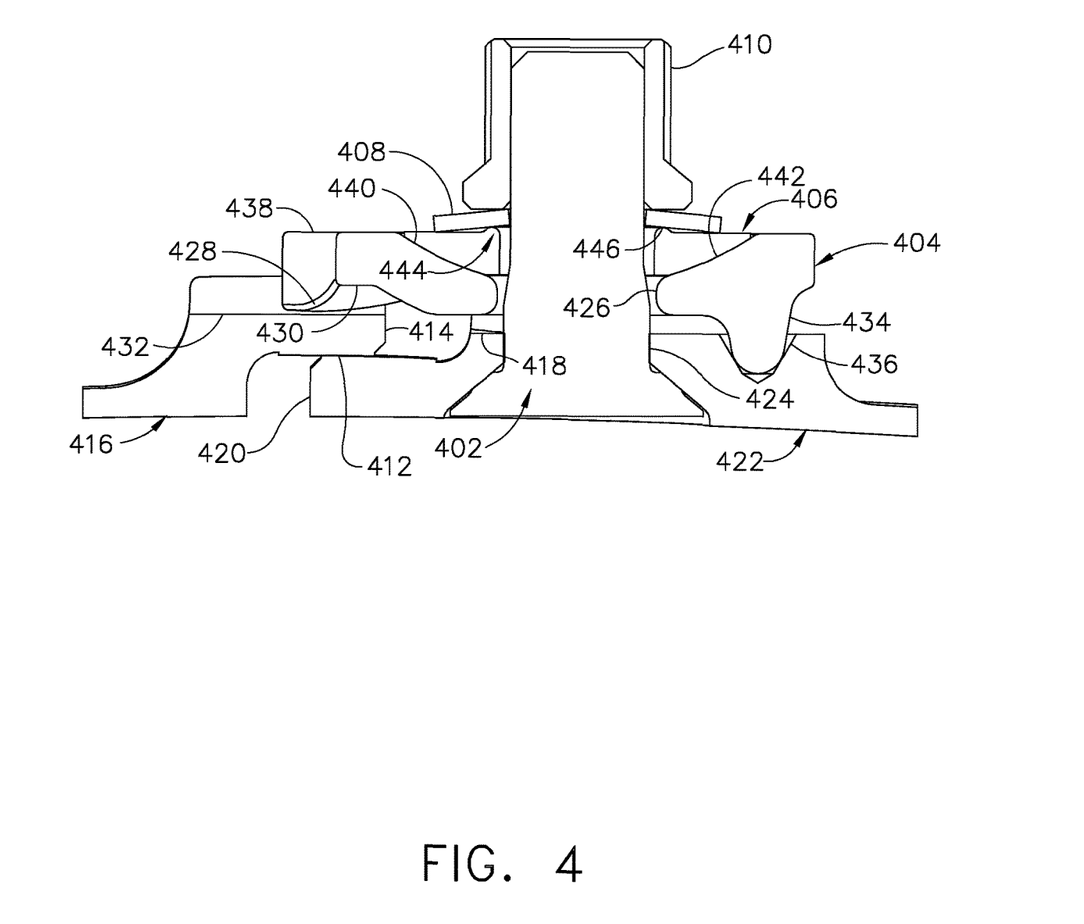
FIG. 4 illustrates a partial cutaway sectional view of an exemplary joint assembly according to an embodiment.

FIG. 4 illustrates a partial cutaway sectional view of an exemplary tripod joint assembly 400. In an aspect of the embodiment, tripod joint assembly 400 is similar in construction and function to joint assembly 218, described above with respect to FIGS. 2 and 3.

Tripod joint assembly 400 includes a threaded fastener 402, a tripod plate 404, a convex washer 406, a spring washer 408, and a threaded locknut 410. Threaded fastener 402 may be a screw or a bolt, and threaded locknut 410 may be a self-locking variety. In an exemplary embodiment, tripod plate 404 is fabricated from a wear-resistant material. Alternatively, tripod plate 404 is fabricated from conventional materials, and coated with a wear-resistant coating. Joint assembly 400 secures an under surface 412 of a radial engagement edge 414 of linear panel segment 416 in slidable engagement with an upper surface 418 of fairing extension 420 of fairing platform 422.

In construction, threaded fastener 402 extends through an opening 424 in fairing extension 420 and through an access hole 426 in tripod plate 404 to locate radial engagement edge 414 of linear panel segment 416 between fairing extension 420 and tripod plate 404. In an exemplary embodiment, tripod plate 404 includes a button 428 that protrudes from a tripod bottom surface 430 to engage an upper contact surface 432 of radial engagement edge 414. In an aspect of the embodiment, button 428 is convex to reduce the amount of surface area that slidably engages with upper contact surface 432. Opposite button 428, with respect to threaded fastener 402, tripod plate 404 further includes a downward protrusion 434 configured to engage a locating indentation 436 in fairing extension 420.

In an aspect of the embodiment, tripod plate 404 is constructed of a single, unitary piece of wear-resistant material. Tripod plate 404 further includes a flat surface 438 including a concave seat 440 disposed in the vicinity of access hole 426. Convex washer 406 includes and outwardly convex lower surface 442 configured to engage a complementary shape of concave seat 440. A central surface 444 of convex washer 406 includes an annular lip 446 disposed near threaded fastener 402 and facing spring washer 408. Spring washer 408 is inwardly angled upward to extend centrally away from convex washer 406 and toward threaded locknut 410. Annular lip 446 is configured to prevent spring washer 408 from reversing this angled direction when threaded locknut 410 is tightened, which is a phenomenon sometimes referred to as "oil-canning." The double washer series connection thus provides both a vertical spring function and a vertical clamping ability assembly During assembly, a diameter (not numbered) of access hole 426 can be made sufficiently large to accommodate manufacturing tolerances to ensure that tripod plate 404 does not contact threaded fastener 402 after assembly, and during operation of the engine. Threaded locknut 410 and spring washer 408 may then be torqued onto threaded fastener 402 to preload tripod plates 404 to engage linear panel segment 416 with fairing platform 422, while still allowing sliding movement between under surface 412 of radial engagement edge 414 and upper surface 418 of fairing extension 420, and between upper contact surface 432 of radial engagement edge 414 and button 428 of tripod plate 404. Spring washer 408 is compressed a desired amount during assembly, thereby allowing individual components of the flowpath liner system to move circumferentially with respect to one another during operation, bu still remain clamped together vertically.

In operation, the exemplary tripod joint assembly described herein provides three dimensional protection against wear to all contacting surfaces, while also keeping the respective components held tightly together, even in the event of wear to some of the components, such as after the respective components have settled and shifted during operation and shut down of the engine. All of the components of the exemplary tripod joint assemblies herein work together to improve the durability of the flowpath liner system, and significantly reduce the cost of repair and maintenance to the system.

The foregoing detailed description illustrates embodiments of the disclosure by way of example and not by way of limitation. It is contemplated that the disclosure has general application to air/oil separators and sump venting for various purposes. It is further contemplated that the methods and systems described herein may be incorporated into existing aircraft engine designs and structures.

It will be appreciated that the embodiments described above in particular detail are merely example or possible embodiments, and that there are many other combinations, additions, or alternatives that may be included. The apparatus illustrated is not limited to the specific embodiments described herein, but rather, components of each may be utilized independently and separately from other components described herein. Each system component can also be used in combination with other system components.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

While the disclosure has been described in terms of various specific embodiments, it will be recognized that the disclosure can be practiced with modification within the spirit and scope of the claims.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A tripod joint assembly for connecting a first overlapping panel segment and a second overlapping panel segment of a flowpath liner in a gas turbine engine, the tripod joint assembly comprising:
   a threaded fastener extending through an opening in the first overlapping panel segment and adjacent an outer segment edge of the second overlapping panel segment disposed on the first overlapping panel segment;
   a tripod plate having a first plate edge and a second plate edge and an access hole therebetween, the first plate edge contacting the first overlapping panel segment, the second plate edge contacting the outer segment edge of the second overlapping panel segment, and the access hole disposed around the threaded fastener;
   a first washer disposed around the threaded fastener on the tripod plate opposite the first overlapping panel segment and the second overlapping panel segment;
   a second washer disposed around the threaded fastener on the first washer opposite the tripod plate; and a threaded locknut secured to the threaded fastener and contacting the second washer opposite the first washer;
   wherein the second washer is a spring washer having an angle that angles radially inwardly towards the threaded fastener and upwardly away from the first washer and the threaded locknut is configured to apply a spring bias by compressing the second washer against the first washer; and
   wherein a central surface of the first washer further includes a substantially flat surface including an annular lip, wherein the annular lip is disposed near the threaded fastener facing the second washer, such that the annular lip comes in contact with the second washer to prevent the second washer from reversing the angle downwardly towards the first washer when the threaded locknut is tightened.

2. The tripod joint assembly according to claim 1, wherein the tripod plate includes a flat surface opposite the first overlapping panel segment and the second overlapping panel segment, and wherein the tripod plate flat surface includes a concave seat around the access hole.

3. The tripod joint assembly according to claim 2, wherein the first washer includes a convex surface configured to mate with the concave seat of the tripod plate.

4. The tripod joint assembly according to claim 1, wherein the first overlapping panel segment is a fairing platform.

5. The tripod joint assembly according to claim 4, wherein the fairing platform includes a protruding mounting base configured to contact the first plate edge of the tripod plate.

6. The tripod joint assembly according to claim 1, wherein the first plate edge of the tripod plate includes a protrusion, and the first overlapping panel segment includes a locating indentation configured to receive a portion of the protrusion.

7. The tripod joint assembly according to claim 1, wherein the second overlapping panel segment includes a contact surface opposite the first overlapping panel segment, and wherein the second plate edge of the tripod plate includes a plate engagement surface having two buttons configured to engage the contact surface of the second overlapping panel segment.

8. The tripod joint assembly according to claim 7, wherein the two buttons are convex with respect to the plate engagement surface.

9. The tripod joint assembly according to claim 1, wherein the first overlapping panel segment includes an expansion surface configured to slidably engage a first surface of the outer segment edge of the second overlapping panel segment adjacent the expansion surface, and wherein the expansion surface and adjacent the first surface each include a wear-resistant coating disposed between the first overlapping panel segment and the second overlapping panel segment.

10. The tripod joint assembly according to claim 9, wherein the tripod plate includes an engagement surface facing the second overlapping panel segment and having a wear-resistant coating disposed thereon, and wherein the outer segment edge of the second overlapping panel segment includes a second surface opposite the first surface, and having a wear-resistant coating disposed thereon between the tripod plate and the outer segment edge.

11. The tripod joint assembly according to claim 9, wherein the tripod plate is unitary and comprises a wear-resistant material.

12. A flowpath liner assembly for a gas turbine engine, the flowpath liner assembly comprising:
an annular forward hanger;
an annular aft hanger;
a plurality of overlapping panel segments disposed radially between the annular forward hanger and the annular aft hanger, each of the plurality of overlapping panel segments having first and second opposing engagement edges extending in the radial direction;
a plurality of fairing platforms disposed radially between the annular forward hanger and the annular aft hanger, each of the plurality of fairing platforms including first and second opposing extension edges extending in the radial direction, the plurality of fairing platforms configured to be disposed in an alternating arrangement with the plurality of overlapping panel segments, and each of the first and second opposing extension edges configured to overlap with a respective adjacent engagement edge of the first and second opposing engagement edges; and
a plurality of tripod joint assemblies configured to respectively couple each of the first and second opposing extension edges with a respective adjacent engagement edge of the first and second opposing engagement edges, each of the plurality of tripod joint assemblies comprising:
a threaded fastener extending through an opening in a first overlapping panel segment of the plurality of overlapping panel segments and adjacent an outer segment edge of a second overlapping panel segment of the plurality of overlapping panel segments disposed on the first overlapping panel segment;
a tripod plate having a first plate edge and a second plate edge and an access hole therebetween, the first plate edge contacting the first overlapping panel segment, the second plate edge contacting the outer segment edge of the second overlapping panel segment, and the access hole disposed around the threaded fastener;
a first washer disposed around the threaded fastener on the tripod plate opposite the first overlapping panel segment and the second overlapping panel segment;
a second washer disposed around the threaded fastener on the first washer opposite the tripod plate; and
a threaded locknut secured to the threaded fastener and contacting the second washer opposite the first washer;
wherein the second washer is a spring washer having an angle that angles radially inwardly towards the threaded fastener and upwardly away from the first washer and the threaded locknut is configured to apply a spring bias by compressing the second washer against the first washer; and
wherein a central surface of the first washer further includes a substantially flat surface including an annular lip, wherein the annular lip is disposed near the threaded fastener and facing the second washer, such that the annular lip comes in contact with the second washer to prevent the second washer from reversing the angle downwardly towards the first washer when the threaded locknut is tightened.

13. The flowpath liner assembly according to claim 12, wherein each of the plurality of fairing platforms includes at least one hollow airfoil configured to allow air communication therethrough.

14. The flowpath liner assembly according to claim 12, wherein the spring washer comprises the first washer configured to couple with the tripod plate about the threaded fastener and the second washer between the first washer and the threaded locknut, the second washer inwardly angled toward the threaded fastener and away from the first washer.

15. The flowpath liner assembly according to claim 12, wherein the tripod plate is unitary and fabricated from wear-resistant material.

16. The flowpath liner assembly according to claim 12, wherein each of the first and second opposing extension edges and each of the first and second opposing engagement edges comprise a wear-resistant coating on respective contacting surfaces therebetween.

17. A gas turbine engine including a high pressure turbine, a high pressure turbine rotor shaft, and a low pressure turbine, the gas turbine engine comprising:
an annular center frame disposed between the high pressure turbine and the low pressure turbine, the annular center frame configured to support the high pressure turbine shaft shaft:
a flowpath liner disposed between the high pressure turbine and the low pressure turbine, the flowpath liner fixedly attached to the annular center frame and configured to shield the annular center frame from exposure to high temperature gases from the high pressure turbine, the flowpath liner comprising:

a plurality of radially disposed overlapping panel segments circumferentially arranged around the annular center frame;

a plurality of radially disposed fairing platforms circumferentially arranged around the annular center frame to alternate with adjacent ones of the plurality of radially disposed overlapping panel segments, each of the radially disposed overlapping panel segments having a circumferential region of overlap with each of adjacent ones of the radially disposed fairing platforms, respectively; and a plurality of tripod joint assemblies configured to couple each of the radially disposed overlapping panel segments with each of adjacent ones of the radially disposed fairing platforms, respectively, at respective circumferential regions of overlap, each of the plurality of tripod joint assemblies comprising:

a threaded fastener extending through an opening in a first overlapping panel segment of the plurality of radially disposed overlapping panel segments and adjacent an outer segment edge of a second overlapping panel segment of the plurality of radially disposed overlapping panel segments disposed on the first overlapping panel segment;

a tripod plate having a first plate edge and a second plate edge and an access hole therebetween, the first plate edge contacting the first overlapping panel segment, the second plate edge contacting the outer segment edge of the second overlapping panel segment, and the access hole disposed around the threaded fastener;

a first washer disposed around the threaded fastener on the tripod plate opposite the first overlapping panel segment and the second overlapping panel segment;

a second washer disposed around the threaded fastener on the first washer opposite the tripod plate; and a threaded locknut secured to the threaded fastener and contacting the second washer opposite the first washer;

wherein the second washer is a spring washer having an angle that angles radially inwardly towards the threaded fastener and upwardly away from the first washer and the threaded locknut is configured to apply a spring bias by compressing the second washer against the first washer; and wherein a central surface of the first washer further includes a substantially flat surface including an annular lip, wherein the annular lip is disposed near the threaded fastener and facing the second washer, such that the annular lip comes in contact with the second washer to prevent the second washer from reversing the angle downwardly towards the first washer when the threaded locknut is tightened.

* * * * *